April 27, 1937. C. J. HALBORG 2,078,632
BROACH
Filed April 19, 1935
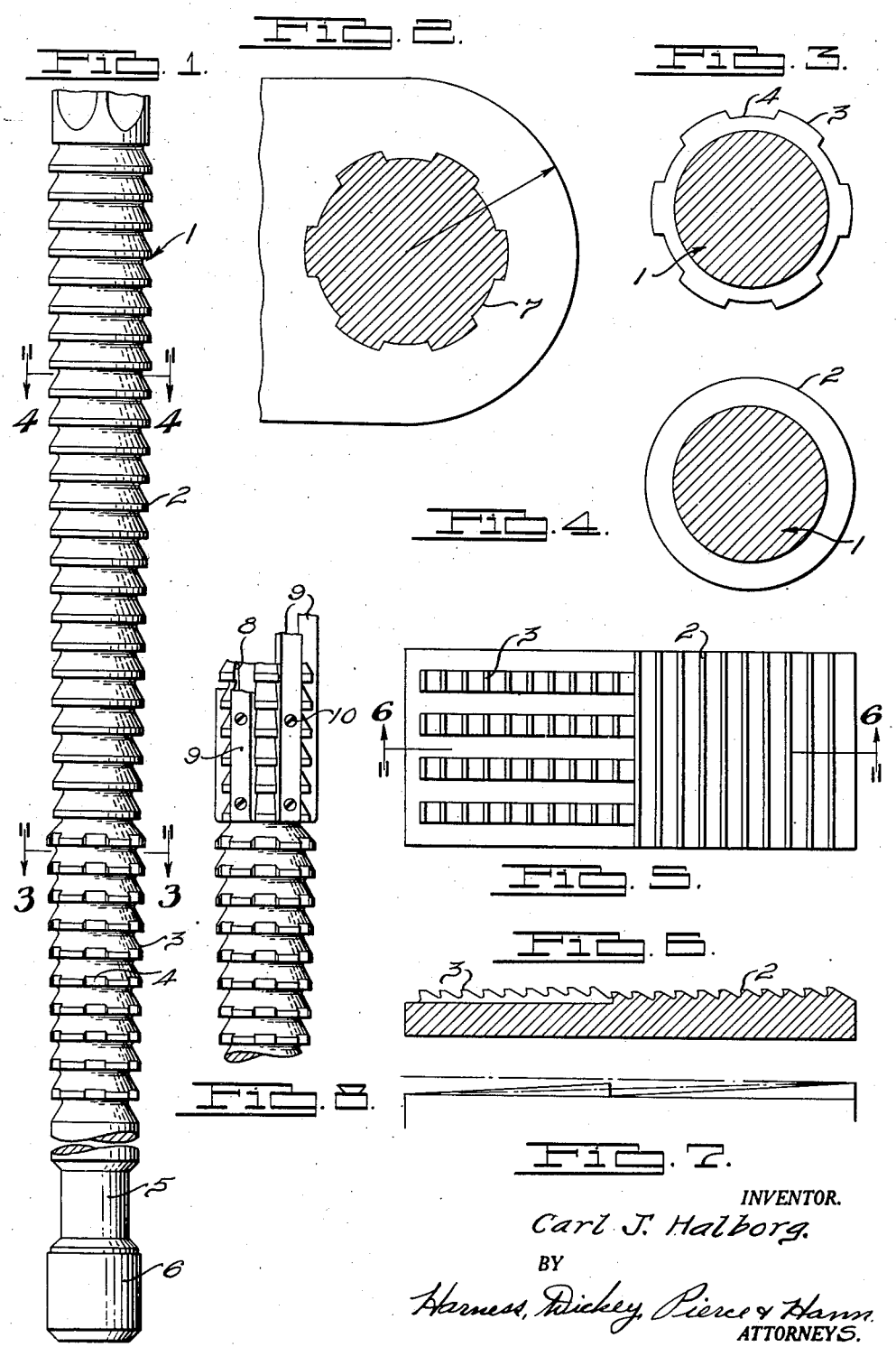
INVENTOR.
Carl J. Halborg.
BY
Harness, Dickey, Pierce & Hann
ATTORNEYS.

Patented Apr. 27, 1937

2,078,632

UNITED STATES PATENT OFFICE 2,078,632

BROACH

Carl J. Halborg, Detroit, Mich., assignor to Colonial Broach Company, a corporation of Michigan Application April 19, 1935, Serial No. 17,199

7 Claims. (Cl. 29—95.1)

The present invention relates to broaching tools and more particularly to a broaching tool construction which overcomes any tendency of such tools to drift and form irregular and crooked holes.

It is customary, in the art to which the present invention relates, to force the broaching tool through the hole which is to be enlarged or shaped by means of machinery attached to the broaching tool at one end thereof to pull or push the broach through the work. Ordinarily the tooth depths of the broaching tool increase progressively towards the following end of the tool. Where large changes in size or shape are made in the work opening, it becomes necessary to use broaching tools of substantial length. Such broaches tend to follow the hole when slanted or crooked and to drift in one direction or another when hard spots are present on the surface presented to the broaching tool. Drilled holes become burnished and glazed when the drill becomes dull, which offers resistance to a broaching operation. When such resistance is greater on one side than on another, the tendency of the broach is to drift away from such burnished or glazed side. When the drilled hole is long and of small diameter, the drill oftentimes runs out of line and produces a crooked hole. When broaching such a hole with a broach having annular teeth, the tendency of the broach is to follow the crooked path of the hole and no correction is effected.

In accordance with the present invention, the tendency of the broaching tool to drift is overcome by constructing it so that in the first part of the broaching operation, only portions of the metal are cut away. During this part of the broaching operation the parts not cut away form guideways which tend to position the broach with reference to the original opening. When no means are employed to positively locate the position of the hole, no clearance is provided between the guiding portions and the hole. When the accurate location of the hole is not of prime importance, clearance is provided between the guiding portions and the hole to permit the broach to straighten the hole if the hole has been warped during the drilling operation. In the illustrated embodiment of the present invention this is accomplished by cutting away portions of each broach tooth. Preferably, a substantial percentage of the broach teeth is cut away in this manner, thus providing a guiding section of substantial length. Preferably, also, the broach teeth included in the guiding section increase progressively to substantially the maximum depth. The broach may be of the same length as the conventional broach, the two sections of offset teeth each effecting a cut equal in depth to that of the conventional annular teeth. Following the two sections, a number of finishing teeth are provided of conventional form to finally dress a thousandth or more of surface from the hole to provide a finish thereto. The surface of the crooked hole, or hardened portions of the hole will offer little resistance to cutting by the cut-away teeth and as a result there will be no tendency of the broach to drift or become distorted to follow the path of a crooked hole.

In accordance with a modification of the present invention, the previously mentioned guiding action may be maintained throughout the entire broaching operation. As illustrated, this is accomplished by providing all of the broaching teeth with the previously mentioned cutaway portions, the cutaway portions throughout one section of the broach conforming longitudinally with tooth sections of a following section of the broach. Strips of metal are preferably inserted in the cutaway portions of the following sections which enter the grooves cut by the first section and act as guides for the following section.

The principal object of the present invention accordingly is to provide a broaching tool construction which eliminates the tendency of such tools to drift and which is simple in construction and economical to manufacture.

Other objects and advantages of the present construction appear more fully in the following description and in the appended claims.

In the drawing:

Figure 1 is a view in elevation of a broaching tool constructed in accordance with the present invention, Fig. 2 is a plan view of an opening formed by the guiding section of a broaching tool organized in accordance with the present invention, Fig. 3 is a view taken on the line 3—3 of Fig. 1, Fig. 4 is a view taken on the line 4—4 of Fig. 1, Fig. 5 is a developed view of the surface of a broaching tool embodying the present invention, Fig. 6 is a sectional view taken on the line 6—6 of Fig. 5, Fig. 7 illustrates diagrammatically the preferred proportioning of tooth depths of a broaching tool embodying the present invention, and Fig. 8 is a view in elevation of a modification of the arrangement shown in Fig. 1.

Referring to Fig. 1 of the drawing, broach 1 comprises a plurality of teeth 2 which, as shown in Figs. 4 and 5, extend around the periphery of tool 1; a plurality of teeth 3 having cutaway sections 4; a shank 5; and a shoulder 6. As will be understood, broach 1 may be connected to a broaching machine at the shank 5 and shoulder 6, and drawn thereby through the opening to be broached.

As shown in each of Figs. 1, 3, 5 and 6, the cutaway portions 4 of teeth 3 are preferably spaced regularly around the periphery of broach 1. Preferably also, the radius of each cutaway portion is somewhat less than the original radius of the opening to be enlarged by the broaching operation. Teeth 3 progressively increase in depth throughout substantially the range of the broach. The teeth 2 increase over a corresponding range, and in addition, include one or more finishing teeth of the maximum depth. These preferred relationships are shown in Figs. 6 and 7.

It will be understood that after teeth 3 have passed through the work piece, an opening is formed, as shown in Fig. 2, in which the sections 7 of reduced radius correspond to the cutaway portions 4 of teeth 3. Sections 7, accordingly, form a positive guide for broach 1, and overcome any tendency of the latter to drift because of irregularities in the hardness of the metal of the work teeth, or for other reasons. It will be understood that the opening is completed by the passage of teeth 2. During this part of the work cycle, the already enlarged sections of the opening tend to maintain the broach in the proper position with respect to the opening.

In accordance with the alternative construction shown in Fig. 8, the broach section including teeth 2 is provided with rows of teeth which are aligned with and of a width substantially the same as the metal between the slots cut by teeth 3. Guiding of these teeth is accomplished by securing strips 9 in spaces 8, by screws 10.

In this arrangement the strips 9 form guides which enter the slots cut by teeth 3, and form positive guides for the broach throughout the remainder of the broaching operation.

Although the present invention has been illustrated as applied to a broach formed to produce a circular opening, it will be obvious that it is applicable to broaches formed to produce openings of other shapes. As modifications may be made in the present construction without departing from the spirit or scope of the present invention, the described embodiment is to be considered in an illustrative, and not in a limiting, sense.

What is claimed is:

1. A broaching tool for enlarging an opening, formed throughout a first portion of its length with teeth, the depths of which increase progressively throughout a certain range and which are formed to enlarge said opening to a predetermined size throughout a portion of the perimeter thereof, and formed throughout a second portion of its length with teeth, the depths of which increase progressively throughout substantially said same range and which are formed to enlarge said opening to said predetermined size throughout the remainder of the perimeter thereof.

2. A broaching tool for enlarging an opening, comprising teeth arranged in two sections, the teeth in each of said sections increasing progressively in depth, the teeth in one of said sections being formed with cutting edges to enlarge said opening to a predetermined size throughout a portion of the perimeter thereof and having guiding portions of reduced size, and the teeth in said other section having cutting edges which register longitudinally of said tool with said guiding portions and being formed to enlarge the remainder of said opening to said predetermined size.

3. A broaching tool for enlarging an opening, comprising teeth arranged in two sections, the teeth in each of said sections increasing progressively in depth, the teeth in one of said sections being formed with cutting edges to enlarge said opening to a predetermined size throughout a portion of the perimeter thereof and having guiding portions of reduced size, and the teeth in said other section having cutting edges which extend throughout the perimeter of said opening and being formed to enlarge the remainder of said opening to said predetermined size.

4. A broaching tool for enlarging an opening, comprising teeth arranged in two sections, the teeth in each of said sections increasing progressively in depth, the teeth in one of said sections being formed with cutting edges to enlarge said opening to a predetermined size throughout a portion of the perimeter thereof and having guiding portions of reduced size, and the teeth in said other section having cutting edges which register longitudinally of said tool with said guiding portions and being formed to enlarge the remainder of said opening to said predetermined size, and having guiding portions which register with the cutting edges of the teeth in said first section.

5. A broaching tool for operating on a work surface, arranged to include leading and following sections each including a plurality of teeth of progressively increasing depth, the teeth in said leading section having longitudinally aligned cutting edges formed to cut away a part only of said surface to a predetermined size, and the teeth in said following section being formed to cut away the remainder of said surface to said predetermined size.

6. A broaching tool for enlarging an opening, arranged to include leading and following sections each including a plurality of teeth of progressively increasing depth, the teeth in said leading section having longitudinally aligned cutting edges formed to enlarge a part only of the perimeter of said opening to a predetermined size, and the teeth in said following section being formed to enlarge the remainder of said perimeter to said predetermined size.

7. A broaching tool for operating on a work surface, formed throughout a first portion of its length with teeth the depths of which increase progressively throughout a certain range and which are formed to cut away a portion only of said surface to a predetermined size, and formed throughout a second portion of its length with teeth the depths of which increase progressively throughout substantially said same range and which are formed to cut away the remainder of said surface to said predetermined size.

CARL J. HALBORG.